United States Patent Office 3,446,780
Patented May 27, 1969

3,446,780
MERCAPTAN CONTAINING POLYURETHANE COMPOSITIONS, PROCESS AND CURED PRODUCTS THEREOF
Eugene R. Bertozzi, Yardley, Pa., assignor to Thiokol Chemical Corporation, Bristol, Pa., a corporation of Delaware
No Drawing. Filed Aug. 31, 1965, Ser. No. 484,097
Int. Cl. C08g *30/14, 23/20, 22/04*
U.S. Cl. 260—75
17 Claims

ABSTRACT OF THE DISCLOSURE

Simple or polymeric organic polyisocyanates react with simple or polymeric polyfunctional ol-thiol compounds under non-alkaline conditions to form stable polyfunctional —SH group containing polyurethane compositions which may be cured to form polymers having good abrasion and chemical resistance and devoid of urea or thiourethane groups.

---

This invention relates to novel organic polymeric urethane materials which contain a plurality of mercaptan groups, a process for preparing these materials, and the condensation cure products thereof.

Mercapto-terminated liquid urethane adducts, such as are disclosed by U.S. Patent 3,114,734, have been prepared wherein either urea or thiourethane linkages join polyisocyanate adductive portions to mercaptan-containing adductive portions. These adducts are formed by reaction of polymercaptans or mercaptoamines with polyisocyanate urethane prepolymers under alkaline conditions. The adducts are cured by oxidative condensation to form disulfide linked elastomeric products. Adducts formed with polymercaptans, and which thus have thiourethane joining linkages, are susceptible however to chemical reversion, that is a splitting at the thiourethane linkage and regeneration of the reactant mercaptan and the reactant isocyanate prepolymer even at temperatures as low as 120 to 150° C. Solid polymeric cure products obtained therefrom when subjected to such temperatures would soften in time, undergo extensive chemical splitting, and extensive changes in physical properties. This presents serious disadvantages to their use at elevated temperatures. Adducts formed with mercaptoamines, and which thus have urea joining linkages, upon cure yield elastomeric products with substantially less "rubberyness" and greater tendencies toward crystallization at low temperatures than their thiourethane linked counterparts. This may lead to an early stress cracking of cure products at low temperatures. The primary advantage however in using such prior art adducts over diisocyanate urethane prepolymers per se is to provide curable compositions which have indefinite storage life without the need to use special precautions to exclude water or other active hydrogen containing materials. The advantage in use of these adducts over that of polymeric polyalkylene polythiopolymercaptans is that they provide cure products at temperatures of 50 to 120° F. which have improved tensile strength and abrasion resistance properties. Therefore, it is desirable to both provide curable mercaptan-containing polymeric urethane adducts which would have enhanced resistance to high temperature reversion such as undesirably occurs with prior art thiourethane linked polymers and yet withal to retain the high degrees of rubberyness of the thiourethane linked polymers but not shown by urea linked polymers; also it is desirable to provide enhanced resistance to low temperature stiffening or crystallization, such as is undesirably imparted by urea linkages, and yet to provide condensed or cured polymeric products which have (a) improved abrasion and (b) good chemical resistance, and yet (c) retain good rubbery properties of cured non-urethane polymercaptans (d) concomitantly with indefinite storability properties of the prior art adducts.

Accordingly, it is an object of this invention to provide a novel general method for preparing urethane polymeric materials which contain a plurality of reactive mercaptan groups, but which are devoid of urea or thiourethane linkages, to provide these novel polymeric materials and to provide novel and useful condensation or cure products thereof.

Another object of this invention is to provide a novel general method for adding mercaptan groups to a polyisocyanate in such a way as to provide novel polymercaptan polymeric addition products which contain urethane linkages.

Other desirable objects will become evident from or are inherent in the following descriptions, explanations and examples.

It has now been found that the objects of this invention may readily be attained by (1) reaction of a mercaptoalcohol with a polyisocyanate, at least one of which reactants is polymeric in nature, under conditions of room or elevated temperatures and in the substantial absence of alkaline active hydrogen-containing substances, such as organic bases, thus to provide novel polymeric addition materials or adducts which contain a plurality of both urethane linkages and reactive mercaptan groups; and by the (2) condensation of a plurality of molecules of at least one polymeric mercaptan-containing substance formed by the foregoing process of this invention, thus to provide novel polymeric urethane substances which are chain-extended and/or crosslinked by means of disulfide linkages and alternately by chain-extension and/or crossing by condensation reactions of the instant adducts with polyisocyanates, polyepoxides and/or carbonyl compounds substantially as discussed below.

In general, the novel mercaptan-containing polymeric urethane addition products of the invention conform to the formula

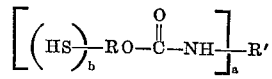

In this notation, *a* and *b* are positive integers, and denote in the formula that there are *a* number of separate

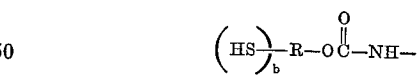

groups each attached to the R' group, and *b* mercaptan groups each attached to the R group. The group R, therefore, is an intervening organic group which has (*b*+1) number of monovalent groups conjoined therewith. R' is an organic intervening group which has *a* number of monovalent groups bonded thereto.

At least one of R and R' is polymeric in nature and they may be predominantly aliphatic, aromatic, alkaryl, and/or siloxyl. At intervals the polymeric chains may occasionally be interrupted by chalcogen, say oxygen and/or sulfur, atoms and/or olefinic groups, viz.

and/or urethane groups. Preferably R' is polymeric. The subscripts *a* and *b* are different, and most preferably *a* is 2 and *b* is 1. For the purposes of this invention *a* is in the range of from 2 to 10, and *b* is in the range of from 1 to 10.

To prepare the mercaptan-containing polymeric adducts of this invention at least one mercaptoalcohol, $(HS)_bR(OH)_c$, is reacted with at least one polyisocyanate, $R'(NCO)_a$ according to Equation 1.

(1)
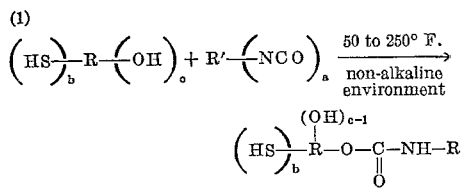

The subscript $c$ is a positive integer that is in the range of from 1 to 10, and preferably is 1. According to the invention, quantities of reactants are employed such that the ratio of the total number of isocyanate groups to the total number of hydroxyl groups present in the reaction mixture is at least 1/1, NCO/OH$\geq$1/1, and preferably is slightly more than 1/1 such as from 1.05/1 to 1.5/1, and not greater than about 5/1. Thus, if one were to employ a mercapto monoalcohol and a diisocyanate, preferably one would use two mols of mercaptoalcohol per mol of diisocyanate to provide the ratio NCO/OH of about 1/1. This would provide for substantially linear adduct formation, that is without branching. Of course, if the mercaptoalcohol has say three or more hydroxyl groups then branched adduct formation would occur as in equations 2, 3 and 4 or their variations.

(2)
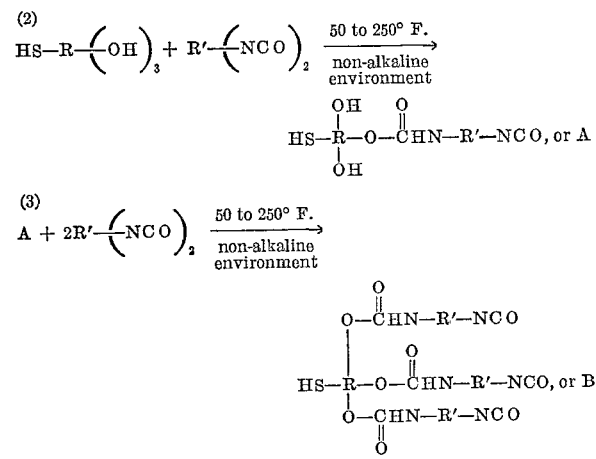

(3)

(4)
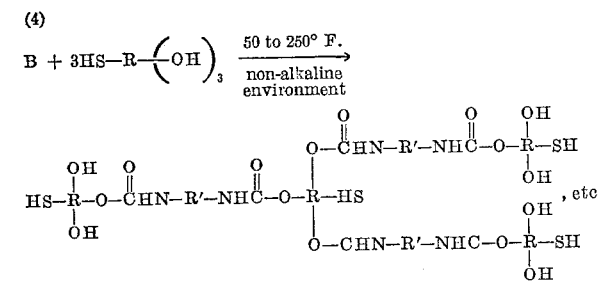

Thus the invention contemplates formation of both linear and branched adducts wherein the plurality of mercaptan groups may be at terminal and/or at intermediate pendant positions on the adduct molecular backbone.

In general, any mercaptoalcohol may be used in reaction with polyisocyanates according to the invention under the conditions and in the quantities required thereby. As has been indicated, useful mercaptoalcohols may be of simple or polymeric nature, having but one mercaptan and one hydroxyl group to as many as, say, ten of each group per molecule of mercaptoalcohol. Among the simple mercaptoalcohols, the monomercaptomonoalkanols are the preferred for present use, and among these 2-mercaptoethanol is most preferred. Other simple mercaptoalcohols which may advantageously be used include mercaptoalkanols such as $HS(CH_2)_nOH$ with $n=2$ to 20, $HS(CH_2CH_2O)_nCH_2CH_2OH$ with $n=1$ to 100,

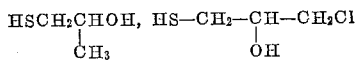

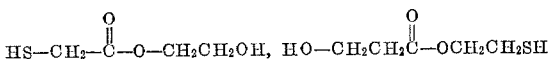

and $HS(CRR')_nOH$ with $n=2$ to 20 and R and R' are as previously defined; and mercaptoalkaryl alcohols such as

Further, mercaptoalcohols of the type $(HS)_bR(OH)_c$ may be usefully employed herein where R is polymeric in nature such as polyalkylene, polyether, polyester, polyalkylene-polysulfide, or polysiloxyl, and wherein the carbon chains may at intervals occasionally be interrupted by connecting groups such as chalcogen atoms, that is sulfur or oxygen, olefinic groups, viz.

and/or urethane linkages, viz.

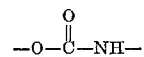

In general, any polyisocyanate may be used in reaction with mercaptoalcohols according to the invention under the conditions and in the quantities required thereby. As was noted above, useful polyisocyanates may be simple or polymeric in nature, having but two or as many as, say, ten isocyanate groups per molecule.

The simple polyisocyanates may themselves be used in the present process of adduct formation by reaction with polymeric mercaptoalcohols; or the simple polyisocyanates may be used to form polymeric polyisocyanates, the most desirable of which are called prepolymers. The polymeric polyisocyanates, in turn, may be used to react with simple or polymeric mercaptoalcohols to provide adducts to this invention.

The non-polymeric or simple polyisocyanates which may be empolyed in adduct formation or to prepare prepolymers useful in the practice of the invention include those wherein the intervening group M which conjoins the plurality of isocyanate groups in the formula $$(NCO)_aM$$

may be aliphatic or aromatic or alkaryl in nature. Typical of the useful simple polyisocyanates are diisocyanates such as the aromatic diisocyanates, viz. the isomers of toluene diisocyanate, m-phenylene diisocyanate, 4-chloro-1,3-phenyl diisocyanate, 4,4'-diphenylene diisocyanate, and 1,5-naphthelene diisocyanate, and such as the aliphatic diisocyanates, viz. 1,4-tetra methylene diisocyanate, 1,10-decamethylene diisocyanate, 1,4-cyclohexylene diisocyanate, and 4,4'-methylene-bis-(cyclohexyl isocyanate), and such as the alkaryl diisocyanates, viz. 4,4'-methylene-bis-(phenylene isocyanate). Mixtures of the simple polyisocyanates also may be used herein.

The urethane prepolymer reactants are organic polymeric substances having a plurality of isocyanate groups, and are of the type depicted by the formula $Q(NCO)_2$. The Q group is predominantly polymeric in nature and is composed of a polymeric portion, that may be designated G, and a plurality of urethane connecting portions that join reactive isocyanate groups to the polymeric portion G, which urethane connecting portions may be written

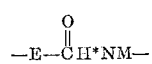

The significance of the M, H*, E and G designations are as defined below.

Prepolymer reactants for present use are formed from substantially linear polymers, i.e. with few if any branchings, that contain a plurality of active hydrogen-containing groups such as hydroxyl, amino, mercapto or carboxyl groups. These linear active hydrogen-containing polymers may be written $(H^*\!-\!E)_dG$, wherein $H^*$ is an active hydrogen atom and $d$ is an integer that is from 2 to about 6. E is a connecting portion between the active hydrogen atom and the polymeric portion G. The term "active hydrogen atom" which, because of its position in the $(H\!-\!E)_dG$ polymer molecule, displays activity according to the Zerewitinoff test as described by Kohler in J. Amer. Chem. Soc. 49, 3181 (1927). The highly electronegative or electron-withdrawing effect of the oxygen, nitrogen or sulfur atoms of the connecting portion E seems to "activate" or make reactive the conjoined active hydrogen atom $H^*$. The G or polymeric portion may be polyester, polyether, polythioether, polyalkylene-polysulfide and/or polysiloxane in nature.

Suitable active hydrogen atom-containing polymers useful to form the prepolymer reactants here envisaged include in their number such polyhydroxyl-containing polymers as polyhydroxyl polyesters, and/or polyethers, and/or polythioethers, and/or polyalkylene-polysulfides, and/or polysiloxanes, and/or copolymers or admixtures thereof. Suitable polyhydroxyl polyesters may be formed as the esterification products of polycarboxylic acids and polyols, using an excess of polyol. Suitable polyhydroxyl polyethers may be formed as the condensation products of polyols and polyepoxides with an excess of the former, or as the acid condensation products of polyols in a polyetherification reaction. Suitable polyhydroxyl polythioethers may be formed as the acid condensation products of such thiopolyols as thiodiglycol and/or another thioether diol. One may also use polyhydroxyl polyetherthioethers which may be formed by the condensation of thioether diols and formaldehyde or a formaldehyde generating compound, or alternately by the acid condensation of a polyol and a polyol thioether, such as dihydroxy diethylene ether and thiodiglycol. Suitable polyhydroxyl polyalkylene polysulfide polymers may be prepared by any of the methods disclosed in U.S. Patents 2,527,375, 2,606,173, 2,676,165, and/or by the acid condensation polyetherification reaction of polyhydroxy alkylene polysulfides, such as the suitable polyhydroxy-containing polysulfides disclosed in U.S. Patents, 2,378,576, 2,484,369, 2,527,374, and 2,858,274, among others. Useful liquid polyhydroxyl polysiloxanes may be prepared by the conventional methods known in the art to prepare so called hydroxyl-end blocked polysiloxanes such as those liquids disclosed in U.S. Patents 2,843,555, 2,934,519, 3,019,204, 3,050,485, 3,050,491, 3,061,575, 3,070,566, 3,077,465, 3,109,826 and 3,110,689. Analogous poly(amino, mercapto and/or carboxyl functional) polymers $(H^*\!-\!E)_dG$ may be prepared by any of the sundry methods presently well known to the art.

The active hydrogen group containing polymer, $(H^*\!-\!E)_dG$, is reacted in the prepolymer forming reaction with a non-polymeric or simple polyisocyanate, that is a non-polymeric organic compound which contains a plurality of reactive isocyanate groups, such that the prepolymer reactant obtained contains a plurality of reactive isocyanate groups. Of the non-polymeric polyisocyanates the diisocyanates are preferred for prepolymer formation, i.e. $(NCO)_2M$. Exemplarily, this may be seen where $d$ and $a$ of the formulae for the active hydrogen group containing polymer and the polyisocyanate are both 2, and the ratio of reactive equivalent weights of isocyanate to active hydrogen of $NCO/H^*=2$ is used, i.e. two mols of a diisocyanate are reacted with one mol of a dihydroxyl-containing polymer, such as may be depicted by Equation 5.

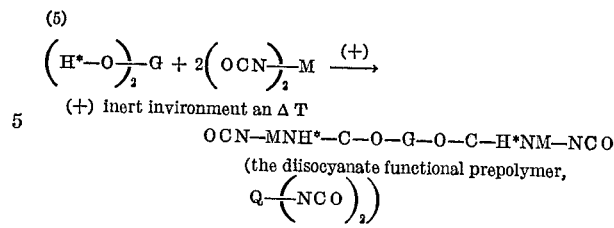

(+) inert invironment an Δ T $$OCN-MNH^*-C-O-G-O-C-H^*NM-NCO$$

(the diisocyanate functional prepolymer, $$G\!-\!(NCO)_a\!))$$

The group M is non-polymeric in nature. The groups M, and G of the non-polymeric polyisocyanate and active hydrogen-containing polymer, respectively, which may be substantially aliphatic, aromatic or alkaryl in nature are non-reactive with isocyanate. The polymeric portion G of the active hydrogen-containing polymer may also be polysiloxyl in nature, or may be copolymeric say with both aliphatic and aromatic repeating units. The preferred polymeric portion G is substantially aliphatic in nature, such as when composed predominantly of polyalkylene, polyester, polyether, polythioether, polyalkylene-polysulfide and/or copolymeric combinations of the foregoing backbone repeating units. Further, the aliphatic carbon chains thereof may occasionally be interrupted with olefinic groups, viz.

$$-\overset{|}{C}=\overset{|}{C}=$$

or with chalcogen atoms, say, of oxygen and/or sulfur, or linearly conjoined with urethane linkages. Mixtures of prepolymers also may be used herein as may mixtures of prepolymers and simple polyisocyanates. The reactive isocyanate groups of the prepolymer may also be in a blocked or "masked" form, such as occurs when the isocyanate groups of the prepolymer are reacted with a blocking or masking compound, provided that the then blocked isocyanate groups thus provided may subsequently be freed under the conditions of reaction with mercaptoalcohols.

Prepolymers and/or polymeric mercaptoalcohols that are useful in the practice of our invention ordinarily are either liquid at room temperatures, or are easily meltable to form liquids. By "easily meltable" is meant that they may readily be melted to a liquid and maintained thereas without chemical change and at temperatures of less than about 100° C. In general, the useful polymeric reactants have average molecular weights in the range of from about 400 to about 10,000. Above about 10,000, a paucity of reactive sites on proximal reactants per unit volume is created and thus provides substantial geometric difficulties for adduct formation. The probability of an adduct reaction occurring between any two reaction groups, that is between any isocyanate group of a polyisocyanate and any hydroxyl from a mercaptoalcohol, is substantially reduced as the molecular weight is increased and the number of isocyanate and/or hydroxyl groups available for adduct forming reactions per unit volume concomitantly is decreased. Thus, in general, polymeric reactants having molecular weights above about 10,000 are not useful to attain adducts according to the invention.

Adduct formation takes place according to the invention at effective reaction temperatures at or above room temperatures, i.e. about 50 to about 250° F., and in a substantially non-alkaline environment.

By non-alkaline environment is meant one that is substantially devoid of alkaline active hydrogen-containing substances such as inorganic or organic bases. Adduct formation proceeds smoothly in the absence of acid or even in the presence of small quantities of acid. Adduct formation proceeds rapidly upon uniform admixture of the reactants at or above room temperatures and is substantially completed within a few minutes to a few hours. Although inert solvents may be used in the process to promote contact between the reactants, they are not necessary. If the polymeric reactant or reactants are easily meltable solids, then their admixture in the present process after melting usually is all that is needed to promote complete adduct formation.

The adducts of the present invention have unique utility in that they have indefinite storage life and they are oxidatively curable to form useful solids, such as elostomers, by means of disulfide linkage formation. The disulfide linkages are especially desirable from the point of providing the cured products with an enhanced resistance to dissolution and/or chemical attack. In this cure it is believed that oxidative condensation, such as is promoted by oxidizing agent catalysts in neutral to alkaline media, proceeds as in Equation 6.

(6) 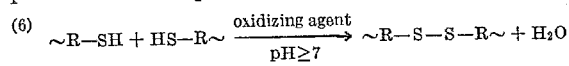
$$\sim\!R\!-\!SH + HS\!-\!R\!\sim \xrightarrow[\text{pH}\geq 7]{\text{oxidizing agent}} \sim\!R\!-\!S\!-\!S\!-\!R\!\sim + H_2O$$

Typical curing agents of this type which may be used are listed in Table II.

(4) Resorcinol diglycidyl ether type which includes those supplied under the designation "Kopoxite" resins, i.e., "Kopoxite 159."

(5) Epoxy novalak type alkyl novalak resins which are phenolic/epoxy type systems and which include the resin supplied under the designation "Dow Epoxy Novalak 438" or "DEN 438–EK 85" that contains 85% resin and 15% methyl ethyl ketone as a solvent therefor, and the resins supplied under the designation "KER" resins, i.e., "KER 357A" and "KER 955A."

(6) Epoxidized linseed oil including the Epoxol materials such as "Epoxol 9–5."

In order to cure the present adducts, they are uniformly admixed with the curing agent in such relative quantities as will provide a suitable number of mercaptan equivalents

TABLE II.—OXIDATIVE CURING AGENTS FOR MERCAPTOALCOHOL-POLYISOCYANATE ADDUCTS

| Inorganic Oxides | | Inorganic Peroxides | | Inorganic Oxidizing Agents | | Organic Peroxides | Organic Oxidizing Agents |
|---|---|---|---|---|---|---|---|
| ZnO | FeO | ZnO$_2$ | FeO$_2$ | Na$_2$CrO$_4$ | NaClO$_4$ | Benzoyl peroxide | Nitrobenzene |
| PbO | Fe$_2$O$_3$ | PbO$_2$ | As$_2$O$_3$ | K$_2$CrO$_4$ | KClO$_4$ | Dicumyl peroxide | Dinitrobenzene |
| MgO | CoO | MgO$_2$ | Sb$_2$O$_3$ | Na$_2$Cr$_2$O$_7$ | Ba(ClO$_4$)$_2$ | Cumene hydroperoxide | Trinitrobenzene |
| CaO | CuO | CaO$_2$ | Sb$_2$O$_5$ | K$_2$Cr$_2$O$_7$ | Na$_2$B$_4$O$_7$ | t-Butyl hydroperoxide | Trinitrotoluene |
| BaO | | MnO$_2$ | SnO$_2$ | (NH$_4$)$_2$Cr$_2$O$_7$ | NH$_4$NO$_3$ | t-Butyl perbenzoate | Other nitro compounds |
| | | TeO$_2$ | Pb$_3$O$_4$ | | | | p-Quinone dioxime and |
| | | SeO$_2$ | | | | | Other oximes |

The present adducts also may be cured by reaction with polyepoxides as in Equation 7.

(7)
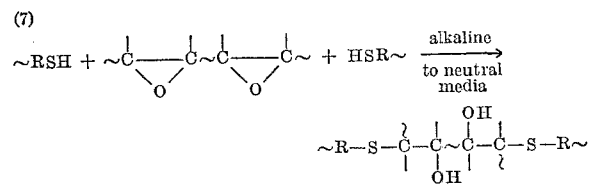

The polyepoxide curing agents are preferably those materials which have an average oxirane functionality of approximately two or more, that is, they are materials which contain an average of at least approximately two epoxide groups per molecule of the polyepoxide material. The position of the epoxide groups in the polyepoxide material is not critical. For instance, if the polyepoxy material is essentially linear in structure the epoxide groups may be in a terminal position or they may be positioned intermediately and/or randomly along the linear structure. Polyepoxide materials which may be used as curing agents herein include the following types of materials:

(1) Essentially linear types such as

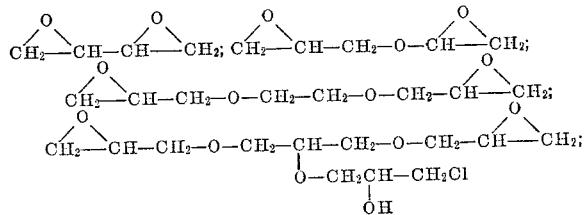

and the epoxidized polybutadiene materials such as those which have an epoxide functionality of four or more and are supplied under the designation "Oxiron" resins (i.e., "Oxiron 2000," "Oxiron 2001" and "Oxiron 2002").

(2) Bisphenol A/epichlorohydrin type which are aromatic in nature and which include those supplied under the trademark designation "TIPOX", i.e., "TIPOX A" "TIPOX B", and "TIPOX C" resins; those available under the designation "Epon" resins, i.e., "Epon 828"; and those supplied under the designation "Bakelite ERL" resins.

(3) Cyclo-aliphatic type which includes those supplied under the designation "Unox" resins, i.e. "Unox 206" which is epoxy ethyl-3,4-epoxy cyclohexane and "Unox 201" which is 3,4-epoxy-6-methylcyclohexylmethyl-3,4-epoxy-6-methylcyclohexanecarboxylate.

of adduct per equivalent of curing agent the latter based usually upon its oxidizing ability that is to say the number of and oxidizing effectiveness of the oxidizing groups or its condensation equivalence. Usually stoichiometric quantities of equivalents of mercaptan and oxidizing or condensing agent will provide adequate cures. With some agents such as PbO$_2$ or polyepoxides, curing may be carried out at common room temperatures or above, whereas with other, such as cumene hydroperoxide or ZnO$_2$, elevated temperatures are needed to promote cure. The cure products obtained are usually solid materials, that may be formed, according to the specific chemical nature of the specific reactants and their polymeric backbones, into chemically or abrasion resistant putty-like materials or castings, films, plastics, elastomers, sealants, threads, coatings and the like. Liquid cure products also may be formed which may be used as inert lubricants. It is believed that the unusual combination of urethane linkages and other linkages in the molecular structure of the cured adducts helps to impart the foregoing cure products with the desirable properties described.

The following examples illustrate modes of practice of the present invention but are not intended to limit the scope thereof.

Example I

Mercaptan-containing poly(ethylene adipate-propylene adipate) polyester urethane liquid polymer adducts and vulcanizates with PbO$_2$ were prepared as follows:

Approximately 0.25 mol (662 g.) of the diisocyanate polyurethane prepolymer which was formed as the reaction product of 1 mol of the ethylene adipate/propylene adipate polyester glycol having a weight ratio of approximately 4:1 of ethylene adipate to propylene adipate units and of molecular weight of approximately 2,500 reacted with 2 mols of the 4:1 w./w. mixture of isomers of 2,4/2,6 toluene diisocyanate under nitrogen, was admixed by hand with 0.5 mol (39 g.) of 2-mercaptoethanol at about 250° C. until a uniform mixture was obtained. The ratio of NCO/OH was 2/1. The product produced was a thick syrupy substance called herein mercaptan-containing urethane Adduct A. Adduct A, when analyzed, had approximately 1% by weight mercaptan and 1.5% by weight isocyanate. In similar manner, 0.25 mol of the foregoing prepoylmer was admixed with 0.4 mol of 2-mercaptoethanol to provide mercaptan-containing urethane Adduct B. The ratio of NCO/OH was 1.25/1. Adduct B had approximately 1.0% mercaptan and 0.9% isocyanate.

Each of Adducts A and B were admixed until uniform with approximately 5 weight percent of lead peroxide, PbO₂, to form curable admixtures. Samples of each admixture were then set at room temperature and at 60–70° C. in an oven to observe the progress of cure, i.e. thickening with time of the admixtures and/or formation of rubber products. The surface of all samples, both those set at room and at 60–70° C. temperatures, had skinned over within 16 hours with a rubbery film. The 60–70° C. treatment of the curable admixture formed with Adduct A produced a rubber with good elastomeric properties within 24 hours. The other samples showed substantial increases in viscosity at 60–70° C. within 24 hours to provide viscous liquids, which also indicated increased chain extension and/or crosslinking. These elastomeric and liquid products are substantially resistant to reversion at elevated temperatures.

Example II

A mercaptan-containing polypropylene glycol urethane liquid polymer adduct and vulcanizate using lead peroxide were prepared as follows:

A diisocyanate urethane prepolymer was formed by the reaction of one mol (2,018 g.) of polypropylene glycol polyether and 2 mols (348 g.) of the 4:1 w./w. 2,4:2,6 isomer mixture of toluene diisocyanate by heating under nitrogen at 100 to 110° C. for about 3 hours. The liquid urethane prepolymer obtained had 3.35% by weight isocyanate and a molecular weight of approximately 2,510.

Approximately 0.45 mol (35.1 g.) of 2-mercaptoethanol was reacted upon uniform admixture with 0.25 mol (627 g.) of the urethane prepolymer, prepared as

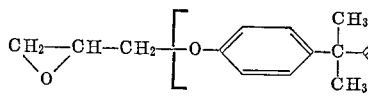 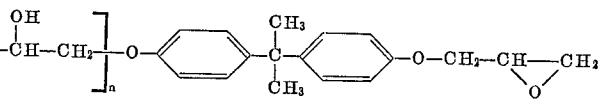

above, in the presence of 0.6 ml. of concentrated sulfuric acid. The reaction mixture was heated for about 24 hours at 60–70° C. The ratio of NCO/OH was 1.11/1. A liquid polymer, Adduct C, was produced which had a mercaptan content of about 2.32% and an isocyanate content of about 0.11% by weight. Approximately 20 grams of Adduct C was admixed with 4 grams of a paste of lead peroxide in a chlorinated biphenyl vehicle, 2 grams of PbO₂/2 grams of chlorinated biphenyl Aroclor 1254. Within 24 hours at room temperature (about 80° F.) the sample had cured, with greatly increased viscosity to form a very thick immoble plastic-like mass. The sample was then place in a 70° C. oven for about 2 hours and had cured to a rubber which had a tacky surface. This rubber is more resistant to reversion at high temperature than a rubber formed from the identical prepolymer and a polymercaptan according to the method of U.S. 3,114,734.

Example III

The urethane prepolymer prepared as in Example II, was reacted with mercaptoethanol in a mol ratio of 0.375 mol (29.3 g.) of mercaptoethanol to 0.25 mol (627 g.) of prepolymer in the presence of 0.6 ml. of concentrated sulfuric acid catalysts for one hour at room temperature (about 80° F.) and for 23 hours at 60–70° C. The ratio of NCO/OH was 1.33/1. The liquid mercaptan-containing polymer obtained, Adduct D, had a mercaptan content of about 1.98% by weight and an isocyanate content of about 0.14% by weight. In similar manner to Example II, Adduct D was cured with lead peroxide to a rubber which had a tacky surface. This rubber is more resistant to stress cracking at low temperatures than a rubber formed from the identical prepolymer and a mercaptoamine according to the method of U.S. 3,114,734.

Example IV

In similar manner to that of Example III, about 0.187 mol (14.6 g.) of mercaptoethanol was reacted with about 0.125 mol (131 g.) of the prepolymer formed as in Example I to provide a liquid mercaptan-containing urethane polymer, Adduct E, which had about 1.98% mercaptan by weight and about 0.176% isocyanate by weight. The ratio of NCO/OH was 1.34/1. Twenty grams of Adduct E was admixed with 8 grams of a 1:1 w./w. curing paste of lead dioxide: chlorinated biphenyl Aroclor 1254 and with 5 drops (about 0.5 g.) of the alkaline cure accelerator triethylenediamine. The curable admixture was set overnight, about 16 hours, at room temperature, about 80° F., and produced a substantially tack-free rubber with good elastomeric qualities. This rubber is more abrasion resistant than that produced by oxidative cure of a non-urethane mercaptan-terminated polymer with a backbone otherwise identical to the prepolymer formed in Example I.

Example V

In similar manner to that used in Example II, a liquid diisocyanate urethane prepolymer was formed from the self-same reactants and had an isocyanate content of 3.32% by weight. A mercaptan-containing adduct, Adduct F, was formed therewith in accordance with the procedure of Example II by reaction of 1.5 mol of 2-mercaptoalcohol per mol of diisocyanate prepolymer, to form initially a ratio of reactants wherein NCO/OH was 1.33/1. Liquid Adduct F thus formed had a mercaptan content of 2.2% by weight and an isocyanate content of 0.67% by weight.

Adduct F was uniformly admixed with a Bisphenol A-epichlorohydrin liquid polyepoxide, Epon 828, which has the backbone structure an epoxide equivalence/100 g. of polymer of 175 to 210 and a viscosity of about 150 poises at 25° C. The quantities used were 10 g. Adduct F/20 g. Epon 828. To this was added 3 g. of 2,4,6-tri(dimethylaminomethyl)phenol, a cure accelerator. In 16 hours at about 23° C., a common room temperature, the curable admixture had fully cured to a clear flexibilized plastic that exhibited good adhesion when formed in situ to polypropylene and to wood.

I claim:

1. A polyurethane adduct containing at least two —SH groups per molecule prepared from a mercaptoalcohol and an organic polyisocyanate both of which are liquid at 100° C. and at least one of which is a polymer which has a molecular weight of about 400 to about 10,000, said adduct being substantially devoid of urea and thiourethane groups formed during the adduct preparation.

2. An adduct of claim 1 wherein said mercaptoalcohol is 2-mercaptoethanol.

3. An adduct of claim 1 wherein said polyisocyanate is a polyurethane prepolymer.

4. An adduct of claim 3 wherein said prepolymer is the reaction product of a non-polymeric organic polyisocyanate and a polymer having a plurality of active hydrogen groups as determined by the Zerewitinoff method and having a backbone containing recurring moieties selected from the class consisting of polyester, polyether, polythioether, polyalkylene, polyalkylene-polysulfide, and polysiloxyl moieties.

5. An adduct of claim 4 wherein said prepolymer is a polyester prepolymer.

6. An adduct of claim 4 wherein said prepolymer is a polyether prepolymer.

7. A cured product obtained by reacting the adduct of claim 4 with a curing agent for mercaptan groups selected from the group consisting of oxidative curing agents and curing agents containing at least two epoxide groups per molecule.

8. A cured product obtained by reacting the adduct of claim 2 with a curing agent selected from the group consisting of oxidative curing agents and curing agents containing at least two epoxide groups per molecule.

9. The product obtained by reacting the adduct of claim 1 with a curing agent for mercaptan groups selected from the group consisting of oxidative curing agents and curing agents containing at least two epoxide groups per molecule.

10. A cured product as in claim 9 where the curing agent is lead dioxide.

11. The product of claim 9 which is a liquid.

12. A process for forming a curable polyurethane adduct containing at least two —SH groups per molecule which comprises reacting a mercaptoalcohol and an organic polyisocyanate at an effective reaction temperature in the substantial absence of alkaline substances and in such quantities that the ratio of isocyanate groups to hydroxyl groups initially present is in the range of from about 1/1 to about 5/1 and wherein said mercaptoalcohol and said polyisocyanate are liquid at 100° C. and wherein at least one of said mercaptoalcohol and said polyisocyanate is a polymer which has a molecular weight of about 400 to about 10,000.

13. A process according to claim 12 wherein said ratio is from about 1.05/1 to about 1.5/1.

14. A process according to claim 12 wherein said polyisocyanate is a polyester polyurethane prepolymer.

15. A process according to claim 12 wherein said polyisocyanate is a polyether polyurethane prepolymer.

16. A process according to claim 13 wherein said prepolymer is an ethylene adipate-propylene adipate polyester polyurethane prepolymer.

17. A process according to claim 15 wherein said prepolymer is a polypropylene ether polyurethane prepolymer.

References Cited

UNITED STATES PATENTS

| | | | |
|---|---|---|---|
| 2,741,800 | 4/1956 | Brockway | 18—58 |
| 2,992,210 | 7/1961 | Gluckman | 260—79.7 |
| 2,929,794 | 3/1960 | Simon et al. | 260—45.4 |
| 3,297,649 | 1/1967 | Kirschner | 260—75 |
| 3,361,720 | 1/1968 | Bertozzi | 260—77.5 |

FOREIGN PATENTS 748,697   5/1956   Great Britain.

OTHER REFERENCES

Beachell et al.: Polymer Letters, vol. 1 (1963), pp. 25–26.

Cranker et al.: Ind. & Eng. Chem., vol. 48, No. 1, Jan. 1956, pp. 98–103.

Saunders et al.: Polyurethanes, Part I, Interscience (New York), 1964, pp. 198–208.

Smith et al.: Jour. Amer. Chem. Soc., vol. 81 (1959), pp. 161–163.

DONALD E. CZAJA, *Primary Examiner.*

H. S. COCKERAM, *Assistant Examiner.*

U.S. Cl. X.R.

252—45; 260—2, 18, 57, 77.5